(12) United States Patent
Borran et al.

(10) Patent No.: US 8,521,206 B2
(45) Date of Patent: Aug. 27, 2013

(54) INTERFERENCE MANAGEMENT WITH REDUCE INTERFERENCE REQUESTS AND INTERFERENCE INDICATORS

(75) Inventors: Mohammad J. Borran, San Diego, CA (US); Avneesh Agrawal, San Diego, CA (US); Aamod D. Khandekar, San Diego, CA (US); Alexei Y. Gorokhov, San Diego, CA (US); Naga Bhushan, San Diego, CA (US); Tingfang Ji, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 994 days.

(21) Appl. No.: 12/425,302

(22) Filed: Apr. 16, 2009

(65) Prior Publication Data

US 2010/0099449 A1 Apr. 22, 2010

Related U.S. Application Data

(60) Provisional application No. 61/047,063, filed on Apr. 22, 2008, provisional application No. 61/108,429, filed on Oct. 24, 2008.

(51) Int. Cl.
*H04B 7/00* (2006.01)
(52) U.S. Cl.
USPC .......................... 455/522; 370/338; 370/343
(58) Field of Classification Search
USPC ........................................................ 455/501
See application file for complete search history.

(56) References Cited

U.S. PATENT DOCUMENTS

| 5,530,917 | A | | 6/1996 | Andersson et al. | |
|---|---|---|---|---|---|
| 5,848,357 | A | * | 12/1998 | Dehner et al. | 455/447 |
| 5,978,657 | A | * | 11/1999 | Suzuki | 455/522 |
| 6,031,827 | A | * | 2/2000 | Rikkinen et al. | 370/330 |
| 6,490,262 | B1 | | 12/2002 | Hogger | |

(Continued)

FOREIGN PATENT DOCUMENTS

| CN | 1778058 A | 5/2006 |
|---|---|---|
| CN | 101001097 A | 7/2007 |

(Continued)

OTHER PUBLICATIONS

International Search Report and Written Opinion—PCT/US2009/041444, International Search Authority—European Patent Office—Oct. 12, 2009.

(Continued)

*Primary Examiner* — Hai Nguyen
(74) *Attorney, Agent, or Firm* — Kam T. Tam

(57) ABSTRACT

Techniques for managing interference in a wireless network are described. In an aspect, reduce interference requests and interference indicators may be used for interference management to enable operation in scenarios with dominant interferers. In one design, a terminal may receive a reduce interference request from a first base station requesting lower interference on specified time-frequency resources. The terminal may also receive an interference indicator conveying the interference observed by a second base station. The terminal may determine its transmit power based on the reduce interference request and the interference indicator. For example, the terminal may determine an initial transmit power based on the reduce interference request (or the interference indicator) and may adjust the initial transmit power based on the interference indicator (or the reduce interference request) to obtain its transmit power. The terminal may transmit data to a serving base station at the determined transmit power.

25 Claims, 7 Drawing Sheets

(56) References Cited

U.S. PATENT DOCUMENTS

| | | | |
|---|---|---|---|
| 6,611,231 B2* | 8/2003 | Crilly et al. | 342/378 |
| 6,618,365 B1* | 9/2003 | Vannatta et al. | 370/333 |
| 7,069,033 B1 | 6/2006 | Moon et al. | |
| 7,085,581 B2* | 8/2006 | Vanghi | 455/522 |
| 7,184,743 B2 | 2/2007 | Walton et al. | |
| 7,218,948 B2 | 5/2007 | Laroia et al. | |
| 7,292,552 B2 | 11/2007 | Willenegger et al. | |
| 7,373,162 B2* | 5/2008 | Farnham et al. | 455/522 |
| 7,453,854 B2 | 11/2008 | Fujishima et al. | |
| 7,499,437 B2* | 3/2009 | Das et al. | 370/338 |
| 7,653,386 B2* | 1/2010 | Bennett | 455/422.1 |
| 7,664,522 B2* | 2/2010 | Stolle et al. | 455/522 |
| 7,720,038 B2* | 5/2010 | Bennett | 370/338 |
| 7,751,843 B2 | 7/2010 | Butala | |
| 7,778,309 B2 | 8/2010 | Jung et al. | |
| 7,813,700 B2 | 10/2010 | Zheng et al. | |
| 7,830,845 B2* | 11/2010 | Bennett | 370/338 |
| 7,864,742 B2* | 1/2011 | Bennett | 370/338 |
| 7,890,061 B2* | 2/2011 | Kasher et al. | 455/67.11 |
| 7,940,740 B2* | 5/2011 | Krishnamurthy et al. | 370/344 |
| 7,965,789 B2* | 6/2011 | Khandekar et al. | 375/297 |
| 7,995,520 B2* | 8/2011 | Takeuchi et al. | 370/328 |
| 8,059,611 B2* | 11/2011 | Ishii et al. | 370/334 |
| 8,112,074 B2* | 2/2012 | Bennett | 455/422.1 |
| 8,165,586 B2* | 4/2012 | Krishnamurthy et al. | 370/335 |
| 8,170,546 B2* | 5/2012 | Bennett | 455/424 |
| 8,265,562 B2* | 9/2012 | Gorokhov et al. | 455/63.1 |
| 8,320,352 B2* | 11/2012 | Sampath | 370/343 |
| 8,320,354 B2* | 11/2012 | Sampath | 370/343 |
| 2003/0109217 A1* | 6/2003 | Reed et al. | 455/3.05 |
| 2004/0166887 A1 | 8/2004 | Laroia et al. | |
| 2005/0007994 A1 | 1/2005 | Fukuzawa et al. | |
| 2005/0122999 A1 | 6/2005 | Scherzer et al. | |
| 2005/0136841 A1* | 6/2005 | Frank | 455/65 |
| 2005/0163164 A1 | 7/2005 | Cramer et al. | |
| 2005/0163194 A1 | 7/2005 | Gore et al. | |
| 2005/0254555 A1 | 11/2005 | Teague et al. | |
| 2007/0041429 A1* | 2/2007 | Khandekar | 375/146 |
| 2007/0097928 A1* | 5/2007 | Anderson | 370/335 |
| 2007/0101020 A1* | 5/2007 | Lin et al. | 709/238 |
| 2007/0105574 A1* | 5/2007 | Gupta et al. | 455/509 |
| 2007/0140168 A1 | 6/2007 | Laroia et al. | |
| 2007/0223434 A1* | 9/2007 | Bennett | 370/338 |
| 2007/0223438 A1* | 9/2007 | Bennett | 370/338 |
| 2007/0242647 A1* | 10/2007 | Bennett | 370/338 |
| 2007/0259680 A1* | 11/2007 | Stolle et al. | 455/522 |
| 2008/0057934 A1 | 3/2008 | Sung et al. | |
| 2008/0069062 A1 | 3/2008 | Li et al. | |
| 2008/0076408 A1* | 3/2008 | Katayama et al. | 455/424 |
| 2008/0205361 A1* | 8/2008 | Takeuchi et al. | 370/338 |
| 2008/0212460 A1* | 9/2008 | Sampath | 370/203 |
| 2009/0022173 A1* | 1/2009 | Horn et al. | 370/460 |
| 2009/0122782 A1* | 5/2009 | Horn et al. | 370/350 |
| 2009/0168800 A1 | 7/2009 | Leinonen et al. | |
| 2009/0175324 A1* | 7/2009 | Sampath et al. | 375/222 |
| 2009/0197538 A1* | 8/2009 | Borran et al. | 455/63.1 |
| 2009/0197588 A1* | 8/2009 | Khandekar et al. | 455/422.1 |
| 2009/0197590 A1* | 8/2009 | Borran et al. | 455/423 |
| 2009/0197629 A1* | 8/2009 | Borran et al. | 455/522 |
| 2009/0197631 A1* | 8/2009 | Palanki et al. | 455/522 |
| 2009/0225885 A1 | 9/2009 | Aoki et al. | |
| 2009/0227263 A1* | 9/2009 | Agrawal et al. | 455/452.1 |
| 2009/0228598 A1* | 9/2009 | Stamoulis et al. | 709/230 |
| 2010/0034077 A1* | 2/2010 | Ishii et al. | 370/210 |
| 2010/0061317 A1* | 3/2010 | Gorokhov et al. | 370/329 |
| 2010/0099428 A1 | 4/2010 | Bhushan et al. | |
| 2010/0099449 A1* | 4/2010 | Borran et al. | 455/501 |
| 2010/0260133 A1* | 10/2010 | Sampath et al. | 370/329 |
| 2011/0105065 A1* | 5/2011 | Sampath et al. | 455/129 |
| 2011/0207410 A1* | 8/2011 | Gupta | 455/63.1 |
| 2011/0216725 A1* | 9/2011 | Miki et al. | 370/329 |
| 2011/0312277 A1* | 12/2011 | Gupta | 455/63.1 |
| 2012/0127985 A1* | 5/2012 | Sampath | 370/345 |

FOREIGN PATENT DOCUMENTS

| | | |
|---|---|---|
| EP | 0650649 A1 | 5/1995 |
| EP | 1072102 A1 | 1/2001 |
| EP | 1594260 A1 | 11/2005 |
| EP | 1808990 A1 | 7/2007 |
| EP | 1850612 A1 | 10/2007 |
| EP | 1676424 B1 | 2/2008 |
| EP | 1887709 A1 | 2/2008 |
| JP | 2008061250 A | 3/2008 |
| JP | 2009514441 | 4/2009 |
| RU | 2122288 C1 | 11/1998 |
| RU | 2198466 C2 | 2/2003 |
| RU | 2293442 C1 | 2/2007 |
| WO | WO9427384 A1 | 11/1994 |
| WO | 9844644 A1 | 10/1998 |
| WO | WO0048327 | 8/2000 |
| WO | 2004064295 A2 | 7/2004 |
| WO | 2006099547 A1 | 9/2006 |
| WO | 2007051140 A2 | 5/2007 |
| WO | WO2009114640 | 9/2009 |

OTHER PUBLICATIONS

Taiwan Search Report—TW098113389—TIPO—Mar. 1, 2013.

* cited by examiner

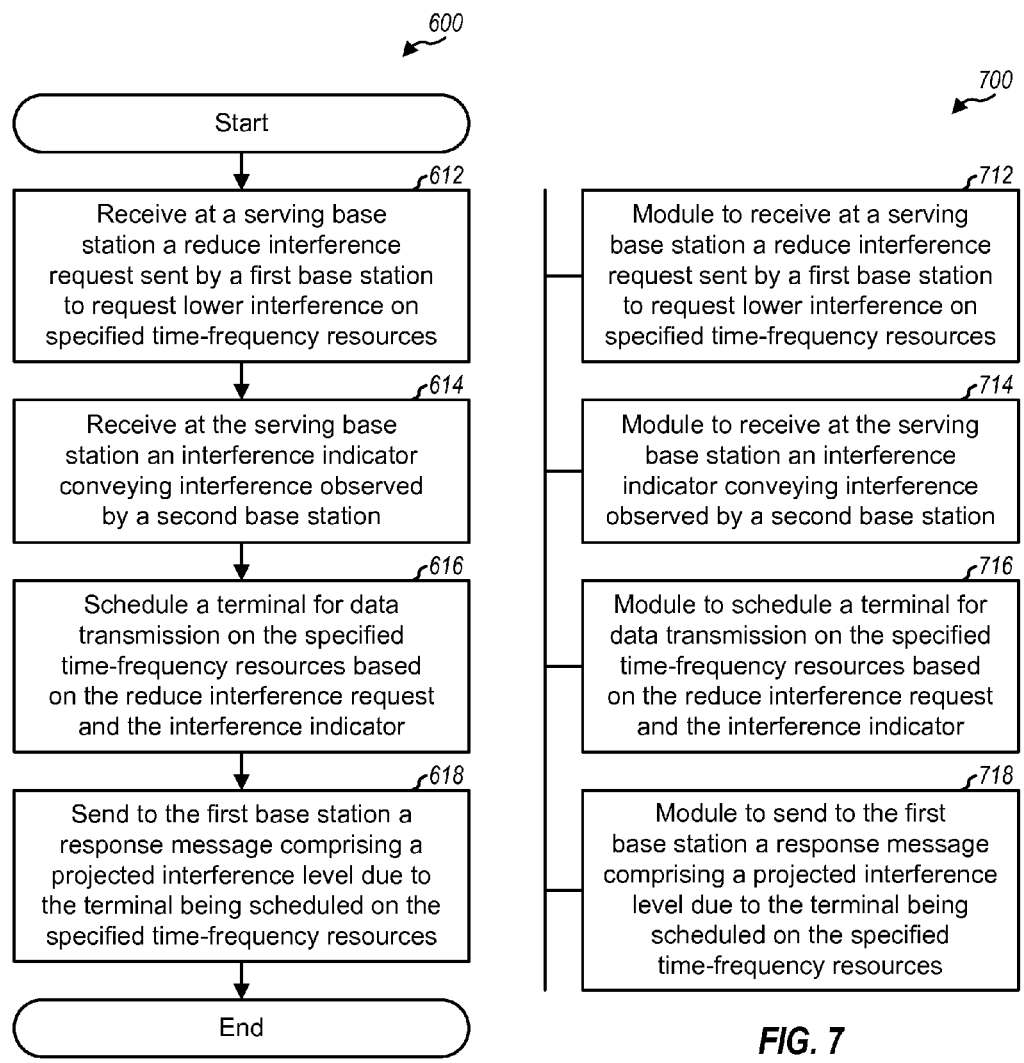

INTERFERENCE MANAGEMENT WITH REDUCE INTERFERENCE REQUESTS AND INTERFERENCE INDICATORS

The present application claims priority to provisional U.S. Application Ser. No. 61/047,063, entitled "INTERACTIONS OF RESOURCE UTILIZATION MESSAGES (RUM) AND OTHER SECTOR INTERFERENCE (OSI) INDICATIONS," filed Apr. 22, 2008, and provisional U.S. Application Ser. No. 61/108,429, entitled "OUT-OF-CLUSTER INTERFERENCE ESTIMATION AND CLUSTER NULL PILOTS," filed Oct. 24, 2008, both assigned to the assignee hereof and incorporated herein by reference.

BACKGROUND

I. Field

The present disclosure relates generally to communication, and more specifically to techniques for mitigating interference in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of terminals. A terminal may communicate with a base station via the downlink and uplink. The downlink (or forward link) refers to the communication link from the base station to the terminal, and the uplink (or reverse link) refers to the communication link from the terminal to the base station. The base station may receive data on the uplink from the terminal. The data transmission from the terminal may observe interference due to transmissions from other terminals communicating with neighbor base stations. The interference due to the other terminals may degrade performance. There is therefore a need in the art for techniques to manage interference in a wireless network.

SUMMARY

Techniques for managing interference in a wireless network are described herein. In an aspect, reduce interference requests and interference indicators may be used for interference management to enable operation in scenarios with dominant interferers. A reduce interference request is a message that may be sent to ask for lower interference on certain time-frequency resources to enable data transmission on these resources. An interference indicator is a message indicating the level of interference observed by a base station. An interference indicator may convey a measured interference value or a coarser quantization of the measured interference, e.g., into two or three levels, which may indicate low, high, or very high interference levels. Separate interference indicators may be generated and transmitted for different time-frequency resources. A reduce interference request may be sent for a specific scheduling instance, e.g., in a dominant interference scenario. An interference indicator may be sent periodically and may not be associated with any specific scheduling instance.

In one design, a terminal may receive a reduce interference request from a first base station requesting lower interference on specified time-frequency resources. The terminal may also receive an interference indicator conveying the interference observed by a second base station. The terminal may determine its transmit power based on the reduce interference request and the interference indicator, as described below. The terminal may transmit data to a serving base station at the determined transmit power. The terminal may also determine whether or not to transmit on designated resources for the second base station based on a decision to honor or dismiss the interference indicator. The designated resources may be used by the second base station to determine controlled interference or uncontrolled interference at the second base station.

In one design, the serving base station may receive a reduce interference request sent by the first base station to request lower interference on specified time-frequency resources. The serving base station may also receive an interference indicator conveying the interference observed by the second base station. The serving base station may schedule a terminal for data transmission on the specified time-frequency resources based on the reduce interference request and the interference indicator. The serving base station may send to the first base station a response message comprising a projected interference level due to the terminal being scheduled on the specified time-frequency resources.

In one design, a base station may send a reduce interference request (e.g., over the air to one or more interfering terminals and/or via the backhaul to one or more other base stations) to request lower interference on specified time-frequency resources. The base station may also send an interference indicator (e.g., over the air and/or via the backhaul) conveying the interference observed by the base station. The base station may determine whether or not to send the interference indicator based on uncontrolled interference at the base station, which may be estimated based on received power of designated resources for the base station and/or response messages comprising projected interference levels due to terminals served by other base stations.

Various aspects and features of the disclosure are described in further detail below.

BRIEF DESCRIPTION OF THE DRAWINGS

FIG. 6 shows a process performed by a serving base station.

FIG. 7 shows an apparatus for the serving base station.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
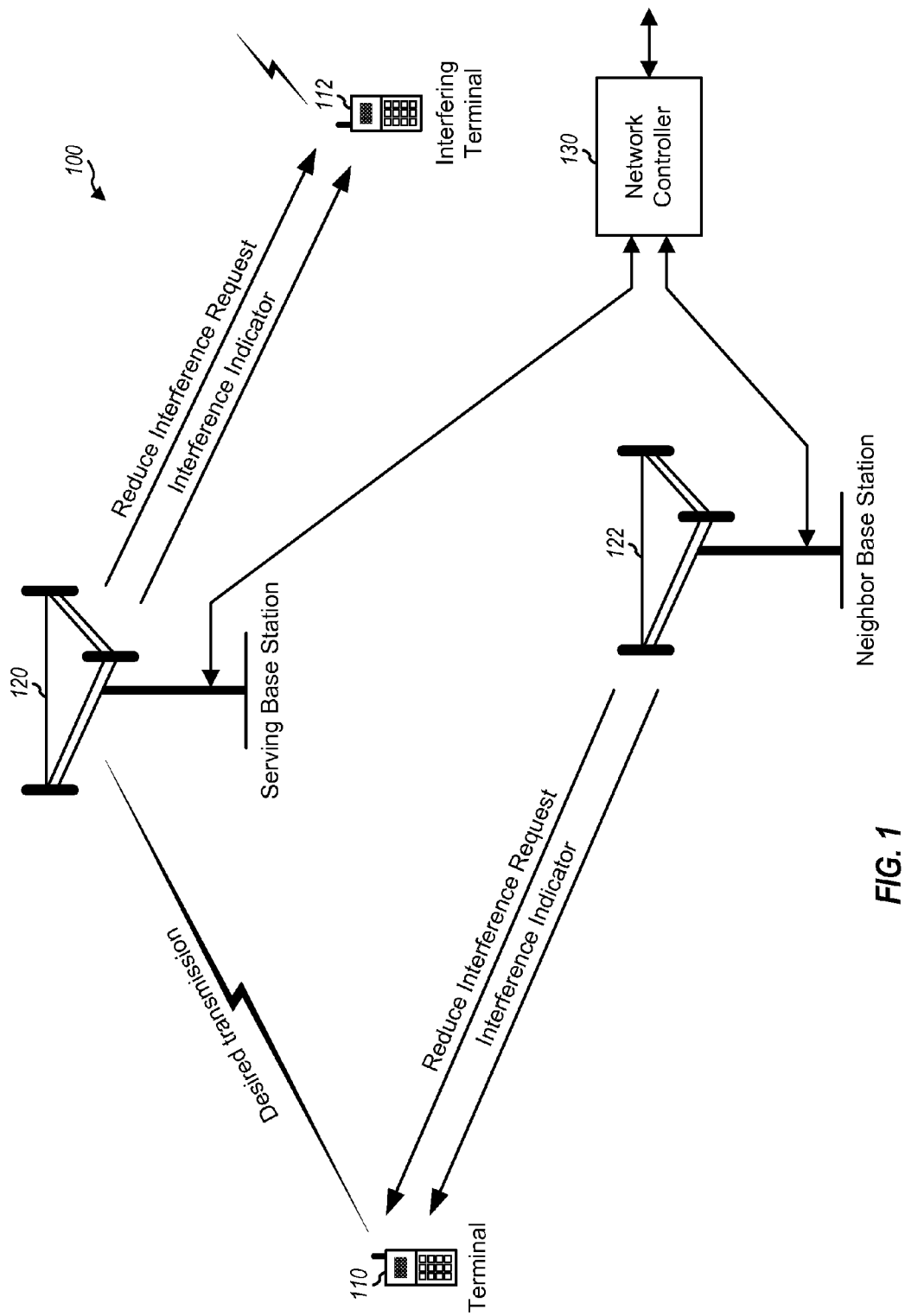
FIG. 1 shows a wireless communication network.

FIG. 1 shows a wireless communication network 100, which may include a number of base stations and other network entities. For simplicity, only two base stations 120 and 122 and one network controller 130 are shown in FIG. 1. A base station may be a station that communicates with the terminals and may also be referred to as a Node B, an evolved Node B (eNB), an access point, etc. Each base station may provide communication coverage for a particular geographic area. In 3GPP, the term "cell" can refer to a coverage area of a base station and/or a base station subsystem serving this coverage area. In 3GPP2, the term "sector" or "cell-sector" can refer to a coverage area of a base station and/or a base station subsystem serving this coverage area. For clarity, 3GPP concept of cell is used in the description below.

A base station may provide communication coverage for a macro cell, a pico cell, a femto cell, etc. A macro cell may cover a relatively large geographic area (e.g., several kilometers in radius) and may allow unrestricted access by terminals with service subscription. A pico cell may cover a relatively small geographic area and may allow unrestricted access by terminals with service subscription. A femto cell may cover a relatively small geographic area (e.g., a home) and may allow restricted access by terminals having association with the femto cell (e.g., terminals for users living in the home). A base station for a macro cell may be referred to as a macro base station. A base station for a pico cell may be referred to as a pico base station. A base station for a femto cell may be referred to as a femto base station or a home base station. Different types of base stations may have different transmit power levels, different coverage areas, and different impact on interference in wireless network 100. For example, macro base stations may have a high transmit power level (e.g., 20 Watts) whereas pico and femto base stations may have a lower transmit power level (e.g., 1 Watt).

Wireless network 100 may also include relay stations. A relay station is a station that receives a transmission of data and/or other information from an upstream station and sends a transmission of the data and/or other information to a downstream station. Network controller 130 may couple to a set of base stations and provide coordination and control for these base stations. Network controller 130 may communicate with base stations 120 and 122 via a backhaul, as shown in FIG. 1. Base stations 120 and 122 may also communicate with one another, e.g., via direct or indirect wireless or wireline link.

Terminals may be dispersed throughout wireless network 100, and each terminal may be stationary or mobile. For simplicity, only two terminals 110 and 112 are shown in FIG. 1. A terminal may also be referred to as an access terminal (AT), a user equipment (UE), a mobile station (MS), a subscriber unit, a station, etc. A terminal may be a cellular phone, a personal digital assistant (PDA), a wireless modem, a wireless communication device, a handheld device, a laptop computer, a cordless phone, a wireless local loop (WLL) station, etc. A terminal may be able to communicate with macro base stations, pico base stations, femto base stations, etc. In FIG. 1, terminal 110 may communicate with serving base station 120 and may cause interference to neighbor base station 122. A serving base station is a base station designated to serve a terminal on the downlink and/or uplink. Terminal 112 may communicate with base station 122 or some other base station and may cause interference to base station 120. Terminal 110 may be an interfering terminal to neighbor base station 122, and terminal 112 may be an interfering terminal to serving base station 120.

A terminal may communicate with a serving base station in a dominant interference scenario. On the downlink, the terminal may observe high interference from one or more interfering base stations. On the uplink, the serving base station may observe high interference from one or more interfering terminals. A dominant interference scenario may be due to range extension, which is a scenario in which a terminal connects to a base station with lower pathloss and lower geometry among multiple base stations detected by the terminal. For example, a terminal may communicate with a pico base station with lower pathloss and lower geometry and may observe high interference from a macro base station. This may be desirable to reduce interference to the wireless network to achieve a given data rate for the terminal A dominant interference scenario may also be due to restricted association, which is a scenario in which a terminal is unable to connect to a strong base station with restricted access and may then connect to a weaker base station with unrestricted access. For example, a terminal may be unable to connect to a femto base station, may connect to a macro base station, and may then observe high interference from the femto base station.

In an aspect, reduce interference requests and interference indicators may be used for interference management to enable operation in dominant interference scenarios. Reduce interference requests and interference indicators may be generated in different manners by base stations and may invoke different responses by terminals and base stations, as described below. The combination of reduce interference requests and interference indicators may enable more effective interference management. For example, reduce interference requests may be more effective in mitigating interference for bursty data, data with quality-of-service (QoS) requirements, etc. Interference indicators may be more effective for other types of data.

Figure 2:
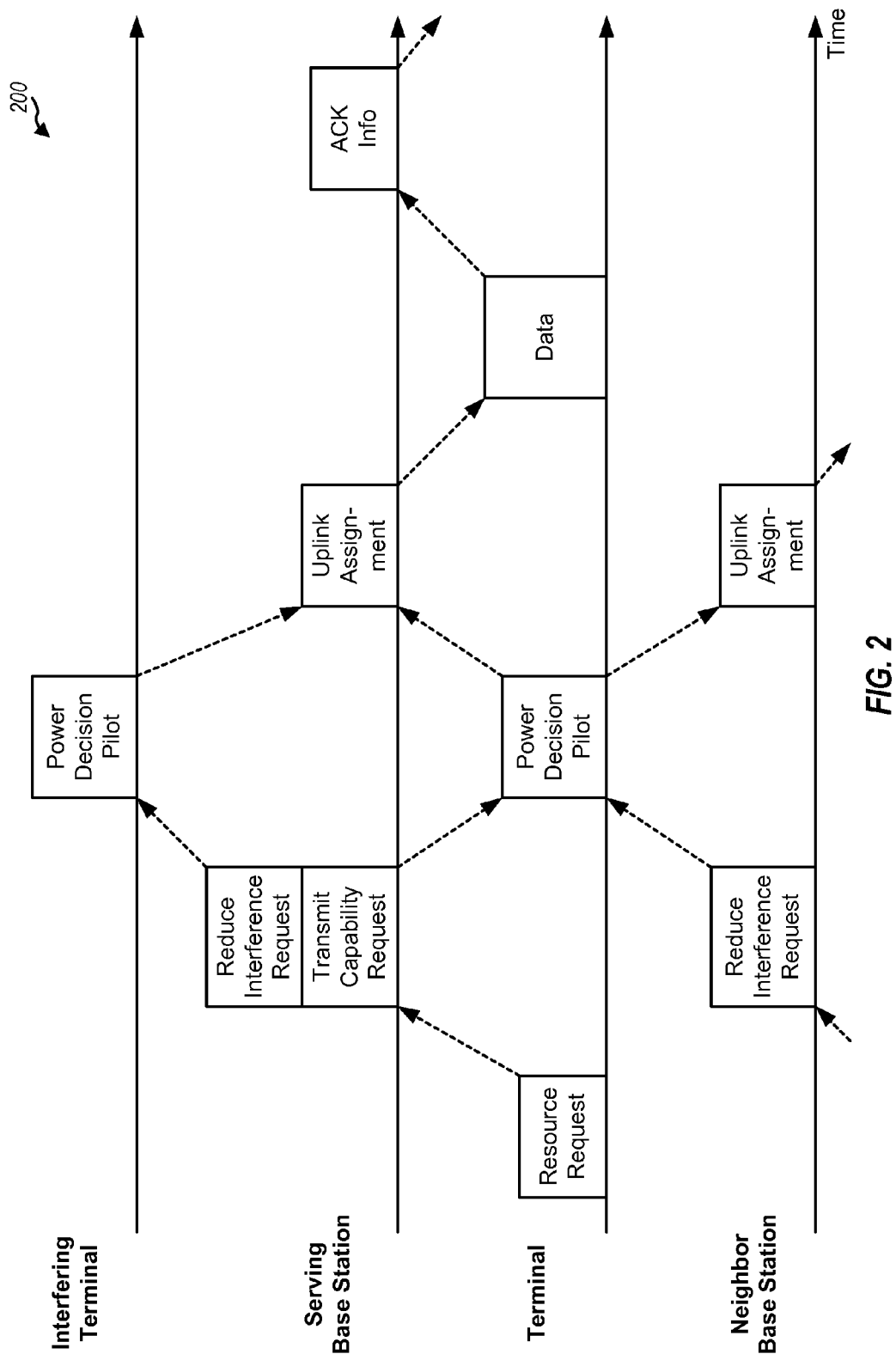
FIG. 2 shows uplink data transmission with interference mitigation.

FIG. 2 shows a design of an uplink data transmission scheme 200 with interference mitigation via reduce interference requests. Terminal 110 may have data to send to serving base station 120 and may send a resource request. The resource request may indicate the priority of the request, the amount of data to send by terminal 110, etc. Serving base station 120 may receive the resource request and may send a transmit capability request to terminal 110 to ask for the transmit capability of the terminal on certain time-frequency resources, which may be referred to as specified resources. Serving base station 120 may also send a reduce interference request to ask interfering terminals to reduce interference on the specified resources. Serving base station 120 may send the reduce interference request (i) as a unicast message to only strong interfering terminals in neighbor cells or (ii) as a broadcast message to all interfering terminals. Each interfering terminal may reduce interference on the specified resources by (i) avoiding or blanking transmission on the specified resources, (ii) reducing its transmit power on the specified resources, or (iii) spatially steering its transmission away from serving base station 120.

Terminal 110 may receive the transmit capability request from serving base station 120 and may also receive reduce interference requests from neighbor base stations, only one of which is shown in FIG. 2. Terminal 110 may determine the transmit power $P_{TX\_terminal}$ that it can use on the specified resources based on the reduce interference requests and interference indicators from the neighbor base stations, as described below. Terminal 110 may then transmit a power decision pilot at a power level of $P_{pdp}$, where $P_{pdp}$ may be equal to $P_{TX\_terminal}$ or a scaled version of $P_{TX\_terminal}$.

In general, transmit power may be given by a transmit power level, a power spectral density (PSD), etc. Transmit power level may be the total transmit power that can be used for transmission. PSD may be transmit power per unit frequency. Transmit power level and PSD may be equivalent for a fixed bandwidth and may be different when the bandwidth is variable. For example, a given transmit power level may result in a given PSD for a given bandwidth and may result in half of the PSD when the bandwidth is doubled. In the description herein, the term "transmit power" can refer to transmit power level and/or PSD, depending on the context in which the term is used and the desired result.

Serving base station 120 may receive the power decision pilots from terminal 110 as well as the interfering terminals. Serving base station 120 may estimate the received signal quality of the specified resources based on the received pilots and may select a modulation and coding scheme (MCS) for terminal 110 based on the received signal quality. Serving base station 120 may generate and send an assignment or grant message, which may include the selected MCS, the assigned resources, the transmit power to use for the assigned resources, etc. The assigned resources may comprise all or a subset of the specified resources. Terminal 110 may receive the assignment message, process a packet in accordance with the selected MCS, and send a packet transmission on the assigned resources. Serving base station 120 may receive the packet transmission from terminal 110, decode the received transmission, determine acknowledgement (ACK) information based on the decoding result, and send the ACK information to terminal 110.

FIG. 2 shows an exemplary design of data transmission on the uplink with interference mitigation via reduce interference requests. Reduce interference requests may also be used in other manners for interference mitigation.

A reduce interference request is a message that may be sent to ask for lower interference on certain time-frequency resources to enable data transmission on these resources. A reduce interference request may also be referred to as a resource utilization message (RUM). Base station 120 may send a reduce interference request over the air to one or more interfering terminals and/or via the backhaul to one or more neighbor base stations. Base station 120 may send the reduce interference request to support data transmission in a dominant interference scenario, to improve inter-cell fairness, etc. For example, base station 120 may perform one or more of the following:

1. Send a reduce interference request over the air to strong interfering terminals in neighbor cells and/or via the backhaul to neighbor base stations serving the strong interfering terminals, prior to scheduling terminal 110, in order to ensure an acceptable amount of interference during transmissions by terminal 110,
2. Send a reduce interference request via the backhaul to neighbor base stations, prior to scheduling terminal 110, in order to give the neighbor base stations advanced notice of high interference that terminal 110 might cause to the neighbor base stations, and
3. Send a reduce interference request over the air to interfering terminals in neighbor cells and/or via the backhaul to neighbor base stations whenever terminals served by base station 120 are disadvantaged and not able to meet QoS requirements or fairness criteria.

Scenario 1 may be used to reduce interference on certain time-frequency resources, which may be assigned to a terminal to be scheduled by base station 120. If the reduce interference request is sent over the air, then interfering terminals in the neighbor cells may reduce their transmit power on the specified resources. If the reduce interference request is sent via the backhaul, then neighbor base stations may avoid scheduling their terminals on the specified resources or may schedule their terminals at lower transmit power on the specified resources.

Scenario 2 may be used to warn neighbor base stations of possible high interference due to a terminal scheduled by base station 120. The neighbor base stations may avoid scheduling their terminals on the specified resources.

Scenario 3 may be used to reduce interference on certain time-frequency resources, which may then be used for disadvantaged terminals served by base station 120. The reduce interference request may enable base station 120 to observe less interference on the specified resources and may thus improve the received signal quality and the QoS of the disadvantaged terminals.

Base station 120 may also send reduce interference requests in other scenarios in order to reduce interference on specified resources. Base station 120 may send a reduce interference request in a unicast message to a specific interfering terminal, in a multicast message to a group of terminals (e.g., terminals in a particular cell), or in a broadcast message to all terminals in neighbor cells.

A reduce interference request may include various types of information that may be useful for interference management. In one design, a reduce interference request may include one or more of the following:

Time-frequency resources on which lower interference is requested,
Priority level of a terminal or data to be scheduled on the specified resources,
Target interference level for the base station sending the request,
Suggested maximum transmit power for interfering terminals on the specified resources, and
Projected interference level that might be caused by the terminal to be scheduled on the specified resources.

The time-frequency resources on which lower interference is requested, i.e., the specified resources, may be provided in various manners. In one design, the specified resources may be explicitly conveyed by the reduce interference request. In another design, the specified resources may be implicitly conveyed by the reduce interference request. For example, the reduce interference request may be sent on certain frequency resources at a particular time. The specified resources may cover (i) certain frequency resources associated with the frequency resources used to send the reduce interference request and (ii) a particular time interval determined by when the reduce interference request was sent. The specified resources may also be conveyed in other manners. The specified resources may also be defined with any time-frequency dimension and any granularity.

The priority level may be determined in various manners and based on various metrics. For example, the priority level may be determined based on metrics for relative throughput or fairness (e.g., for best-effort type of data), latency, absolute priority (e.g., determined based on QoS requirements), etc.

The target interference level may indicate the maximum amount of interference that can be caused by an interfering terminal to base station 120. The target interference level may be given by a total interference power, an interference-over-thermal ratio (IoT), etc. IoT is the ratio of interference PSD to thermal noise PSD. In one design, the target interference level may be provided explicitly by the reduce interference request. In another design, the target interference level may be implicitly conveyed via the transmit power of the reduce interference request, if it is sent over the air. For example, the transmit power of the reduce interference request may be set as follows:

$$P_{TX\_RUM} = P_{REF} - I_{target}, \quad \text{Eq (1)}$$

where $I_{target}$ is the target interference level at base station 120, $P_{REF}$ is a reference level, and $P_{TX\_RUM}$ is the transmit power of the reduce interference request.

The quantities in equation (1) are in logarithmic units, e.g., dBm, dBm/Hertz, or dB. As shown in equation (1), the transmit power of the reduce interference request may be inversely related to the target interference level. The reduce interference request may be sent with higher transmit power for a lower target interference level and may then reach interfering terminals farther away. The transmit power of the reduce interference request may also be determined based on other parameters such as the received power of terminal 110 at base station 120.

An interfering terminal may estimate the pathloss from base station 120 to that terminal, e.g., based on pilot received from base station 120. The interfering terminal may then determine its transmit power such that the interference caused to base station 120 is at or below the target interference level, as described below.

The suggested maximum transmit power for the interfering terminals may be conveyed in various manners. In one design, the suggested maximum transmit power may be explicitly conveyed by the reduce interference request, e.g., in the form of a specific transmit power level, or a specific received power level, or a specific PSD. Each interfering terminal may then limit its transmit power accordingly.

The projected interference level that might be caused by a terminal scheduled on the specified resources may be given in the form of a total interference power, an IoT, etc. The projected interference level may be an actual amount of interference that might be caused by the scheduled terminal or may be an upper bound on the amount of interference that might be caused.

A reduce interference request may also include different and/or additional information. For example, a reduce interference request may identify a specific interfering terminal or a group of interfering terminals requested to reduce interference on the specified resources. A reduce interference request may also include (i) a target signal-to-noise ratio (SNR) or a target rate (e.g., instead of a target interference level), (ii) a measure of performance/quality of service improvement that might be achieved if the target interference/SNR/rate is achieved on the specified resources (i.e., if the interfering terminals honor the reduce interference request), (iii) transmit power (of an interfering terminal) or received interference (from an interfering terminal) corresponding to a fraction of total desired performance improvement (this may help the interfering terminal to choose among different power levels based on the impact on its own performance), and (iv) other similar metrics.

An interference indicator is a message indicating the level of interference observed by a base station. In one design, an interference indicator may comprise one or more of the following:

Other sector interference (OSI) indicator conveying interference observed by a base station, Overload indicator indicating whether a base station is overloaded, and High interference indicator (HII) providing advance notice of high interference that a base station might cause to neighbor base stations by scheduling cell-edge terminals on specified resources.

Interference indicators may be used for interference management on the uplink in order to achieve tighter IoT distributions at the base stations. This may enable more accurate rate prediction and improved link budget. In one design, an interference indicator may be applicable for the entire system bandwidth. In another design, the system bandwidth may be partitioned into multiple subbands, and an interference indicator may be applicable for one subband. A base station may also send interference indicators periodically, and each interference indicator may be applicable for a particular time duration. In general, an interference indicator may be applicable for certain time-frequency resources, which may cover any frequency resources and any time duration.

Base station 120 may determine an interference indicator based on interference measured by base station 120, e.g., on certain time-frequency resources. The measured interference may be given by an IoT or some other metric. Base station 120 may filter the measured interference over time and/or frequency to improve measurement accuracy. Base station 120 may compare the measured interference against one or more interference thresholds and may set the interference indicator based on the comparison result. In one design, a single interference threshold may be used, and the interference indicator may be set as follows:

$$\text{Interference Indicator} = \begin{cases} \text{'1'} & \text{if } I_{meas} > I_{threshold} \\ \text{'0'} & \text{otherwise} \end{cases} \quad \text{Eq (2)}$$

where $I_{meas}$ is the measured interference by base station 120, and $I_{threshold}$ is the interference threshold.

In another design, two interference thresholds may be used, and the interference indicator may be set as follows:

$$\text{Interference Indicator} = \begin{cases} \text{'2'} & \text{if } I_{meas} > I_{high\_threshold} \\ \text{'1'} & \text{if } I_{high\_threshold} \geq I_{meas} > I_{low\_threshold} \\ \text{'0'} & \text{otherwise} \end{cases} \quad \text{Eq (3)}$$

where $I_{high\_threshold}$ and $I_{low\_threshold}$ are two interference thresholds.

In general, the interference indicator may comprise any number of bits to convey any number of interference levels. A suitable number of thresholds may be used to achieve the desired quantization of the measured interference. The interference indicator may also cover time-frequency resources of any dimension and any granularity.

Interference indicators may be used by base stations to manage high interference observed by the base stations. Base station 120 may send an interference indicator (e.g., an OSI indicator and/or an overload indicator) to indicate high interference observed on certain time-frequency resources by base station 120. Base station 120 may send the interference indicator over the air to interfering terminals and/or via the backhaul to neighbor base stations serving the interfering terminals. In response to the interference indicator, the interfering terminals may adjust their transmit power so that the interference observed by base station 120 is brought down to an acceptable level. This interaction between base station 120 and the interfering terminals and/or their serving base stations may enable closed-loop control of interference at base station 120. This closed-loop control may be more robust against link imbalance due to calibration errors, uncorrelated fading on the downlink and uplink, and/or other sources of static or dynamic imbalance between the downlink and uplink. Link imbalance refers to different channel conditions on the downlink and uplink.

Base station 120 may decide to not transmit interference indicators for time-frequency resources on which interference control is not required. This may be the case if base station 120 is not scheduling any terminals on the time-frequency resources, e.g., due to limited or no data to send on the uplink, reduce interference requests received for the resources, loss of contention for the resources, etc. Base station 120 may also transmit interference indicators for the time-frequency resources but may use higher threshold(s) in generating the interference indicators.

Base station 120 may send interference indicators to interfering terminals in neighbor cells. Some terminals and/or their serving base stations may honor/obey the interference indicators, and these terminals may then cause "controlled" interference to base station 120. Other terminals and/or their serving base station may dismiss/ignore the interference indicators, and these terminals may then cause "uncontrolled" interference to base station 120. Examples of such terminals/ serving base stations are the terminals/base stations that cannot receive the interference indicators from base station 120, or terminals/base stations that have won reduce interference request contention on certain time-frequency resources. The terms "controlled" and "uncontrolled" refer to the ability of the base station to control the interference via the interference indicators. The total interference at base station 120 may include both controlled interference from terminals honoring the interference indicators and uncontrolled interference from terminals dismissing the interference indicators.

Base station 120 may determine that the uncontrolled interference on certain time-frequency resources is the dominant component of the total interference on these resources at base station 120 or is larger than an interference threshold. Base station 120 may then decide to not transmit interference indicators for these time-frequency resources since the interference indicators may not help to reduce the high interference at base station 120 and may instead cause unnecessary reduction in the transmit power of terminals honoring the reduce interference requests. It may thus be desirable to be able to distinguish between controlled and uncontrolled interference at base station 120.

In one design, base station 120 may be assigned time-frequency resources that may be used for interference measurements. These resources may be referred to as null pilot resources, designated resources, interference measurement resources, etc. Base station 120 may have a single set of null pilot resources for the entire system bandwidth, or different sets of null pilot resources for different subbands, etc. Different base stations may be assigned different non-overlapping null pilot resources.

In one design, terminals that honor the interference indicators from base station 120 do not transmit any signal on the null pilot resources of base station 120. These terminals may achieve this by puncturing/deleting any transmission of data, control information, and/or pilot mapped to the null pilot resources. Terminals that dismiss the interference indicators may transmit on the null pilot resources in the normal manner. Base station 120 may estimate the uncontrolled interference by measuring the received power of the null pilot resources and may filter the measurement to improve accuracy. Base station 120 may also measure the received power of other resources and may filter the measurement to estimate the total interference. Base station 120 may determine the controlled interference by subtracting the uncontrolled interference from the total interference.

In another design, terminals that honor interference indicators from base station 120 may transmit on the null pilot resources of base station 120 in the normal manner. Terminals that dismiss the interference indicators may avoid transmitting on the null pilot resources. Base station 120 may estimate the controlled interference based on the received power of the null pilot resources, estimate the total interference based on the received power of other resources, and determine the uncontrolled interference by subtracting the controlled interference from the total interference.

Interference from terminals served by base stations of different power classes may also be distinguished using null pilot resources. For example, different null pilot resources may be reserved for different power classes at each base station. In one design, terminals served by base stations of a given power class A may avoid transmitting on the null pilot resources for power class A. Terminals served by base stations of other power classes may transmit on the null pilot resources for power class A. For example, terminals served by macro base stations may avoid transmitting on null pilot resources for macro base stations, and terminals served by pico base stations may avoid transmitting on null pilot resources for pico base stations. The interference due to terminals served by base stations of other power classes may be determined based on the received power of the null pilot resources for power class A. In another design, terminals served by base stations of power class A may transmit on the null pilot resources for power class A. The interference due to terminals served by base stations of power class A may then be determined based on the received power of the null pilot resources for power class A.

Figure 3:
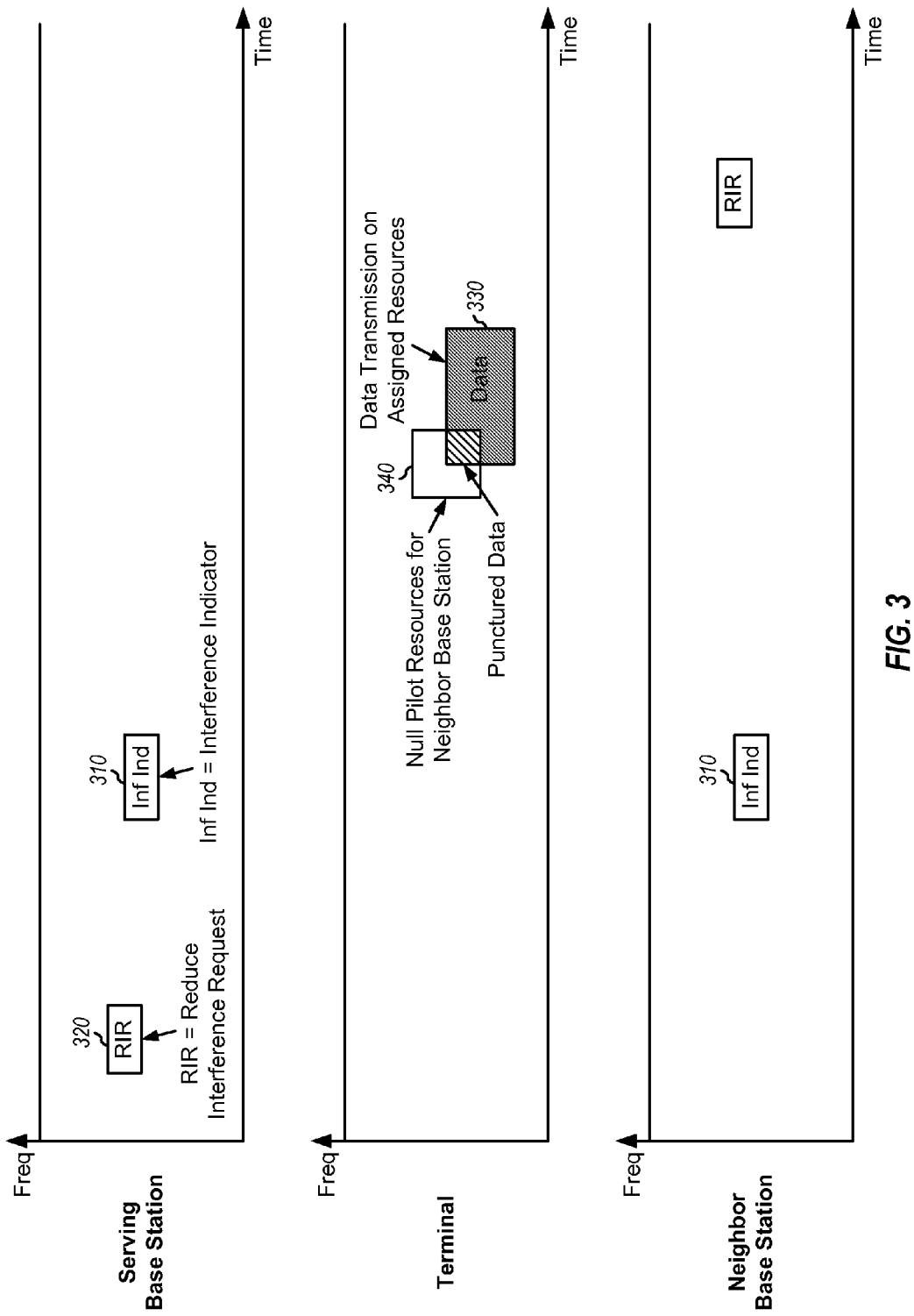
FIG. 3 shows exemplary downlink and uplink transmissions.

FIG. 3 shows downlink transmissions by base stations 120 and 122 and uplink transmission by terminal 110 for data transmission on the uplink with interference mitigation. Each base station may periodically transmit interference indicators 310 conveying the interference observed by that base station. Serving base station 120 may observe high interference from interfering terminals in other cells and may send a reduce interference request 320 for specified resources prior to scheduling terminal 110. The interfering terminals may reduce their transmit power on the specified resources. Terminal 110 may send data 330 on assigned resources, which may comprise all or a subset of the specified resources. Terminal 110 may puncture its data and pilot on null pilot resources 340 of neighbor base station 122 whose interference indicator is honored by terminal 110.

Terminal 110 or its serving base station 120 may use open loop projection to determine the transmit power of terminal 110 for a given uplink assignment or on certain time-frequency resources. Open loop projection determines the transmit power of a terminal by projecting the amount of interference at a neighbor base station. Terminal 110 may communicate with serving base station 120 and may cause interference to neighbor base station 122, which may be an interfered base station. Neighbor base station 122 may send a reduce interference request, which may be honored by terminal 110. The transmit power of terminal 110 may then be set to meet a target interference level for base station 122.

In one design, terminal 110 may determine its transmit power based on open loop projection, as follows:

$$P_{TX\_terminal} = I_{target} + PL_{IBS} - K_{backoff}, \quad \text{Eq (4)}$$

where $I_{target}$ is the target interference level at the interfered base station, $PL_{IBS}$ is the pathloss from the interfered base station to the terminal, $K_{backoff}$ is a back-off factor, and $P_{TX\_terminal}$ is the transmit power of the terminal.

The quantities in equation (4) are in logarithmic units, e.g., dBm, dBm/Hertz, or dB. As shown in equation (4), the transmit power of terminal 110 may be proportional to both the target interference level and the pathloss for the interfered base station. Higher transmit power may be used for a higher target interference level and/or a larger pathloss. The back-off factor may be used to refine the open loop projection in equation (4).

Serving base station 120 may also determine the transmit power of terminal 110 based on various parameters such as the received power of terminal 110 at base station 120, a channel difference (ChanDiff) between base station 120 and the interfered base station, and a back-off factor. The ChanDiff may be given as:

$$\text{ChanDiff} = PL_{IBS} - PL_{SBS}, \quad \text{Eq (5)}$$

where $PL_{SBS}$ is the pathloss from the serving base station to the terminal

Terminal 110 may determine pathloss for each base station based on a pilot or reference signal received from that base station and may average the pathloss over time to obtain a long-term pathloss. Terminal 110 may determine the ChanDiff for an interfered base station based on the long-term pathloss for serving base station 120 and the long-term pathloss for the interfered base station. Terminal 110 may send the ChanDiff in a pilot measurement report to serving base station 120.

In one design, serving base station 120 may determine the transmit power of terminal 110 based on open loop projection, as follows:

$$P_{TX\_terminal} = I_{target} + \text{ChanDiff} + PL_{SBS} - K_{backoff}, \quad \text{Eq (6)}$$

As shown in equation (6), the transmit power of terminal 110 may be determined by serving base station 120 based on the target interference level for the interfered base station, the ChanDiff reported by terminal 110, the pathloss estimated by serving base station 120 based on pilot received from terminal 110, and the back-off factor. The open loop projection in equation (6) may be based mostly on downlink observations by terminal 110, without taking into account uplink fade or other sources of link imbalance. To enhance the accuracy of the open loop projection, the back-off factor may be adjusted in a closed-loop manner based on the interference indicators to correct for link imbalance and/or other sources of interference.

Serving base station 120 may use various targets to compute the transmit power of terminal 110. In one design, the transmit power of terminal 110 may be computed based on a target total interference power for the interfered base station, which may be normalized by thermal noise. In another design, the transmit power of terminal 110 may be computed based on a target IoT for the interfered base station. The target IoT may be computed using an average IoT target, a maximum IoT target, etc. In yet another design, the transmit power of terminal 110 may be computed based on a target increase in interference with respect to the current interference level at the interfered base station, which may be provided to serving base station 120.

Terminal 110 may receive reduce interference requests from neighbor base stations. Terminal 110 may determine whether to honor or dismiss the reduce interference requests. In one design, terminal 110 may honor all reduce interference requests that it can successfully decode.

In another design, terminal 110 may honor reduce interference requests that satisfy one or more criteria. For example, terminal 110 may honor the reduce interference requests from each neighbor base station with the ChanDiff exceeding a ChanDiff threshold, with a carrier-over-thermal (CoT) exceeding a CoT threshold, with a carrier-to-interference ratio (C/I) exceeding a C/I threshold, with the amount of resources specified by the reduce interference request not exceeding a resource threshold, or with some other metric of the reduce interference request exceeding a particular threshold. Terminal 110 may not be a strong interferer to neighbor base stations whose reduce interference requests are received very weak at terminal 110 or whose specified resources are much larger than the resources assigned to terminal 110, in which case the interference caused by terminal 110 may be narrowband compared to the specified resources.

In yet another design, terminal 110 may honor reduce interference requests that (i) are successfully decoded and/or satisfy one or more criteria and (ii) have higher priority level than the priority level of terminal 110. The priority level of terminal 110 may be determined by terminal 110, e.g., based on the QoS requirements of the data to send on the specified resources and/or other metrics. The priority level of terminal 110 may also be determined by serving base station 120 (e.g., based on relative throughput or fairness of terminal 110, latency or QoS requirements of terminal 110, etc.) and may be sent to terminal 110 via an assignment message.

In yet another design, terminal 110 may honor or dismiss reduce interference requests based on the current resource assignment of terminal 110. For example, terminal 110 may dismiss reduce interference requests if its assigned resources are less than a particular assignment size. This design may be useful for certain types of data such as (i) data for VoIP, which may have stringent latency or QoS requirements, (ii) data that is likely to cause little and/or narrowband interference, (iii) data sent in later HARQ transmissions, which may have greater value due to resources already expended to send prior HARQ transmission, and (iv) other data.

In yet another design, terminal 110 may honor or dismiss reduce interference requests based on the transmit power or the received C/I of terminal 110. Terminal 110 may dismiss reduce interference requests if its transmit power is below a transmit power threshold or if its received C/I at serving base station 120 is below a C/I threshold. The thresholds may be set based on various factors such as (i) the QoS requirements and/or the assignment size of terminal 110, (ii) the priority level or the received power of the reduce interference requests, (iii) information from the reduce interference requests, and/or (iv) other information. This design may guarantee a certain minimum level of service for terminal 110 while limiting the amount of interference caused to neighbor base stations.

Terminal 110 may receive interference indicators from neighbor base stations. Terminal 110 may determine whether to honor or dismiss the interference indicators. In one design, terminal 110 may honor all interference indicators that it can successfully decode. In another design, terminal 110 may honor interference indicators that satisfy one or more criteria. For example, terminal 110 may honor the interference indicators from each neighbor base station with the ChanDiff exceeding a ChanDiff threshold, with a CoT exceeding a CoT threshold, with a C/I exceeding a C/I threshold, or with some other metric of the neighbor base station exceeding a particular threshold.

In yet another design, terminal 110 may dismiss interference indicators from pico base stations if terminal 110 is served by a macro base station. The macro base station may serve many terminals (which may be referred to as macro terminals) and may provide a smaller allocation of resources to each macro terminal. In contrast, a pico base station may serve few terminals (which may be referred to as pico terminals) and may provide a larger allocation of resources to each pico terminal. The macro terminals may thus be at a disadvantage with respect to the pico terminals. This disadvantage may be offset by allowing the macro terminals to dismiss the interference indicators from pico base stations. The macro base station may reserve some resources for a pico base station, if needed, to allow the pico base station to serve its terminals on the uplink in the presence of high interference from the macro terminals. In general, terminals served by base stations of a particular power class may be allowed to dismiss interference indicators from base stations of one or more other power classes.

In yet another design, terminal 110 may honor interference indicators from macro base stations with greater weight or higher priority if terminal 110 is served by a pico base station. The pico terminals may be allocated more resources on average, and the advantage of the pico terminals with respect to the macro terminals may be offset by this design. In general, terminals served by base stations of a certain power class may honor interference indicators from base stations of one or more other power classes with greater weight or higher priority.

Terminal 110 may honor an interference indicator from a macro base station with greater weight or higher priority in various manners. In one design, terminal 110 may adjust its transmit power by a larger step size in response to the interference indicator. In another design, terminal 110 may adjust the ChanDiff for the macro base station, e.g., such that the response of terminal 110 would be similar to the response of a macro terminal with a lower ChanDiff without any adjustment. In yet another design, terminal 110 may use higher probabilities and/or may assume higher level indications in stochastic/probabilistic algorithms for transmit power adjustment based on interference indicators.

In yet another design, terminal 110 may dismiss interference indicators from a femto base station if terminal 110 is not served by the femto base station. In yet another design, terminal 110 may dismiss interference indicators from a base station with a small negative ChanDiff value, where small may be quantified by a threshold. The small negative ChanDiff value may be an indication that terminal 110 will be participating in interference mitigation with the base station through resource reservation.

Terminal 110 may receive reduce interference requests and/or interference indicators from neighbor base stations. Terminal 110 may determine whether to honor or dismiss each reduce interference request and each interference indicator, as described above. Terminal 110 may have only reduce interference requests to honor, or only interference indicators to honor, or both to honor.

Terminal 110 may have only reduce interference requests to honor and may then determine its transmit power based on the reduce interference requests. Terminal 110 may determine the target interference level for each reduce interference request based on the content of the request or the received power of the request, as described above. Terminal 110 may then determine its transmit power for each reduce interference request based on the target interference level for that reduce interference request, e.g., as shown in equation (4). Terminal 110 may select the lowest transmit power among the transmit powers computed for all reduce interference requests. This may allow terminal 110 to meet the target interference levels of all neighbor base stations.

Terminal 110 may have only interference indicators to honor and may then determine its transmit power directly or indirectly based on the interference indicators. For clarity, the following description assumes that each interference indicator has a value of '0' or '1', which may be defined as shown in equation (2).

In one design, terminal 110 may adjust its transmit power based on an interference indicator, as follows:

$$P_{TX\_terminal}(n) = \begin{cases} P_{TX\_terminal}(n-1) + P_{up} & \text{if Interference Indicator} = \text{'0'} \\ P_{TX\_terminal}(n-1) - P_{down} & \text{otherwise} \end{cases} \quad \text{Eq (7)}$$

where $P_{TX\_terminal}(n)$ is the transmit power of the terminal in time interval n, $P_{up}$ and $P_{down}$ are up and down step sizes, respectively, for the transmit power.

In another design, terminal 110 may adjust a power offset based on an interference indicator, as follows:

$$\Delta P(n) = \begin{cases} \Delta P(n-1) + \Delta P_{up} & \text{if Interference Indicator} = \text{'0'} \\ \Delta P(n-1) - \Delta P_{down} & \text{otherwise} \end{cases} \quad \text{Eq (8)}$$

where $\Delta P(n)$ is the power offset in time interval n, and $\Delta P_{up}$ and $\Delta P_{down}$ are up and down step sizes, respectively, for the power offset.

Terminal 110 may then determine its transmit power, as follows:

$$P_{TX\_terminal}(n) = P_{ref}(n) + \Delta P(n), \quad \text{Eq (9)}$$

where $P_{ref}(n)$ is a reference power level in time interval n. The reference power level may be the transmit power for a reference signal or pilot and may be adjusted with closed-loop power control to achieve a target C/I at serving base station 120. The transmit power of terminal 110 may then be offset from the reference power level by the power offset.

In yet another design, terminal 110 may adjust a maximum transmit power level and/or a minimum transmit power level based on an interference indicator, e.g., in similar manner as shown in equation (7). Terminal 110 may then constrain its transmit power to be within the maximum and minimum transmit power levels.

In yet another design, terminal 110 may adjust the back-off factor $K_{backoff}$ based on an interference indicator, e.g., as shown in equation (8). Terminal 110 may then determine its transmit power with the back-off factor, e.g., as shown in equation (4).

In the designs described above, terminal 110 may adjust a power-related value (e.g., the transmit power, the power offset, the maximum and/or minimum transmit power level, or the back-off factor) in a deterministic manner based on an interference indicator. In this case, each interference indicator may result in adjustment of the power-related value either up or down, depending on whether the interference indicator is '1' or '0'.

In other designs, terminal 110 may adjust the power-related value in a probabilistic manner based on an interference indicator. Terminal 110 may select a random value x uniformly distributed between 0 and 1.0 and may then adjust the power-related value based on the random value. For example, terminal 110 may adjust its transmit power in a probabilistic manner, as follows:

$$P_{TX\_terminal}(n) = \begin{cases} P_{TX\_terminal}(n-1) + P_{up} & \text{if } (Inf\ Ind = \text{'}0\text{'}) \text{ AND} \\ & (x < Pr_{up}) \\ P_{TX\_terminal}(n-1) - P_{down} & \text{if } (Inf\ Ind = \text{'}1\text{'}) \text{ AND} \\ & (x < Pr_{down}) \end{cases} \quad \text{Eq (10)}$$

where $Pr_{up}$ is a probability for increasing the transmit power,
$Pr_{down}$ is a probability for decreasing the transmit power, and
"Inf Ind" denotes an interference indicator.

$Pr_{up}$ and $Pr_{down}$ may be fixed values or may be broadcast by a base station. $Pr_{up}$ and $Pr_{down}$ may also be computed by terminal 110 based on the ChanDiff value and/or the current transmit power, received CoT, or received C/I. Terminal 110 may also adjust other power-related values in a probabilistic manner.

Terminal 110 may receive interference indicators from one or more neighbor base stations. In one design, terminal 110 may identify the strongest neighbor base station with the smallest ChanDiff. Terminal 110 may then adjust its transmit power based on the interference indicator from only the strongest neighbor base station. In another design, terminal 110 may adjust its transmit power based on the interference indicators from all base stations in a selected set. This set may include (i) M strongest neighbor base station, where M≧1, (ii) neighbor base stations with ChanDiff exceeding a ChanDiff threshold, (iii) neighbor base stations with pathloss exceeding a pathloss threshold, (iv) neighbor base stations included in a neighbor list that may be broadcast by serving base station 120, or (v) one or more neighbor base stations selected in other manners. Terminal 110 may adjust its transmit power in various manners based on the interference indicators from multiple neighbor base stations. In one design, terminal 110 may decrease its transmit power if any neighbor base station observes high interference. In another design, terminal 110 may determine a transmit power adjustment for each neighbor base station and may then combine the adjustments for all neighbor base stations to obtain an overall transmit power adjustment. Terminal 110 may also adjust its transmit power based on interference indicators from multiple neighbor base stations in other manners.

Terminal 110 may adjust its transmit power based on the interference indicators in various manners, as described above. Terminal 110 may also adjust one or more internally maintained values based on the interference indicators. Terminal 110 may report to serving base station 120 its transmit power, the power offset, the maximum and/or minimum transmit power level, the back-off factor, the internal values, and/or other values that may be adjusted based on the interference indicators. Serving base station 120 may use the reported information to determine the transmit power of terminal 110 and may convey the transmit power in an assignment message.

Terminal 110 may have both reduce interference requests and interference indicators to honor and may then determine its transmit power based on the reduce interference requests and the interference indicators.

In one design, terminal 110 may determine whether or not to transmit based on the reduce interference requests. If a decision is made to transmit, then the transmit power of terminal 110 may be determined in various manners. In a first design, the transmit power of terminal 110 may be assigned by serving base station 120, e.g., in the form of the transmit power $P_{TX\_terminal}(n)$ or the power offset $\Delta P(n)$. The assigned transmit power may be adjusted based on the interference indicators received from neighbor base stations. In a second design, an initial transmit power of terminal 110 may be determined based on open loop projection, e.g., as shown in equation (4). The initial transmit power may be adjusted based on the interference indicators received from the neighbor base stations. In a third design, the transmit power of terminal 110 may be initially determined based on one or more variables, which may be maintained by terminal 110, and may be adjusted based on interference indicators from the neighbor base stations.

In another design, an initial transmit power of terminal 110 may be determined based on the reduce interference requests, e.g., as shown in equation (4). The initial transmit power may be adjusted based on the interference indicators from the same base stations and/or other base stations, e.g., based on any of the designs described above.

In yet another design, an initial transmit power of terminal 110 may be determined based on interference indicators from neighbor base stations, open loop projection, and/or explicit assignments from serving base station 120. The initial transmit power may be adjusted based on the reduce interference requests.

In yet another design, the maximum and/or minimum transmit power levels for terminal 110 may be determined based on the reduce interference requests. The transmit power of terminal 110 may be determined based on the interference indicators from neighbor base stations, open loop projection, and/or explicit assignments from serving base station 120. The transmit power of terminal 110 may then be constrained to be within the maximum and minimum transmit power levels. The maximum and/or minimum transmit power levels may also be adjusted based on the subsequent interference indicators from the same and/or other base stations.

Terminal 110 may collect information such as parameters sent in reduce interference requests received by terminal 110, values computed by terminal 110 based on the reduce interference requests, the transmit power of terminal 110, the maximum and/or minimum transmit power levels for terminal 110, internal values determined based on interference indicators, etc. Terminal 110 may send the collected information to serving base station 120 via a physical channel and/or inband transmissions. Serving base station 120 may use the information to determine the transmit power of terminal 110 in future uplink assignments.

Terminal 110 may transmit null pilots to all neighbor base stations whose interference indicators are honored by terminal 110. On the uplink, a null pilot is non-transmission on designated time-frequency resources by a terminal. If the transmit power of terminal 110 is reset or adjusted based on the reduce interference requests, then the null pilots may assist the neighbor base stations to further adjust their observed interference through the interference indicators.

Serving base station 120 may receive reduce interference requests via the backhaul from one or more neighbor base stations. The backhaul reduce interference requests may convey (i) advance scheduling notices from the neighbor base stations, (ii) priority and fairness-related information for the neighbor base stations, (iii) target interference levels for specified resources at the neighbor base stations, and/or (iv) other information.

Serving base station 120 may determine whether to honor or dismiss each reduce interference request based on various factors such as the priority level of the reduce interference request, the ChanDiff values and the resource assignment sizes of terminals to be scheduled by serving base station 120 on the specified resources, the transmit powers of the terminals, the received C/I of the terminals, etc. Serving base station 120 may determine whether to honor or dismiss each reduce interference request based on any of the designs described above for terminal 110. Serving base station 120 may send a response message via the backhaul to each neighbor base station to indicate its decision of honoring or dismissing the reduce interference requests from that neighbor base station.

Serving base station 120 may also convey projected interference levels it may cause to each neighbor base station on the specified resources when scheduling its terminals. This information may be divided into controlled interference and uncontrolled interference, which may be estimated as described above. This information may be sent in the response message or in a separate message, which may be sent at a different rate and/or with different triggers than the response message. Neighbor base station 122 may use the information on the controlled and uncontrolled interference to determine whether or not to send interference indicators. For example, neighbor base station 122 may decide to not send an interference indicator for certain time-frequency resources if the uncontrolled interference on these resources is the dominant component or is larger than an interference threshold.

Serving base station 120 may receive interference indicators via the backhaul from one or more neighbor base stations. Serving base station 120 may determine whether to honor or dismiss the interference indicators from the neighbor base stations when scheduling terminal 110. For example, serving base station 120 may determine whether to honor or dismiss the interference indicators from neighbor base station 122 based on the ChanDiff value of terminal 110 with respect to neighbor base station 122, the power classes of serving base station 120 and neighbor base station 122, the association types (restricted or unrestricted) of the serving and neighbor base stations, etc.

Serving base station 120 may schedule its terminals based on the reduce interference requests and/or the interference indicators to be honored by serving base station 120. In one design, serving base station 120 may determine whether or not to schedule terminal 110 on specified resources based on the backhaul reduce interference requests. Serving base station 120 may then determine the transmit power of terminal 110 in various manners if terminal 110 is scheduled. In a first design, the transmit power of terminal 110 may be determined via open loop projection, e.g., as shown in equation (6), and may be further adjusted based on the interference indicators from the neighbor base stations. In a second design, the transmit power of terminal 110 may be determined based on one or more variables maintained by serving base station 120 for terminal 110 and may be adjusted based on the interference indicators from the neighbor base stations. In a third design, the transmit power of terminal 110 may be determined based on one or more variables reported by terminal 110 to serving base station 120. The reported variable(s) may be maintained by terminal 110 and adjusted based on interference indicators from the neighbor base stations.

In another design, base station 120 may determine the transmit power of terminal 110 via other mechanisms such as feedback information from terminal 110, interference indicators from neighbor base stations, open loop projections, etc. Base station 120 may then adjust the transmit power of terminal 110 based on the backhaul reduce interference requests, e.g., in accordance with any of the designs described above for terminal 110.

Base station 120 may send backhaul reduce interference requests to neighbor base stations. In one design, the backhaul reduce interference requests may carry information on projected interference levels that terminals served by base station 120 may cause to other base stations on the specified resources. The projected interference levels may be determined based on open loop projection and in accordance with reduce interference requests received by base station 120 from neighbor base stations. The projected interference levels may be divided into controlled and uncontrolled interference levels. In another design, the backhaul reduce interference requests may convey target interference levels for interfering terminals that may be scheduled by neighbor base stations on the specified resources.

Base station 120 may also receive information on projected interference levels that neighbor base stations may cause to base station 120 by scheduling their terminals on the specified resources. Base station 120 may use this information along with its measurements of observed interference on the specified resources to determine whether or not to issue interference indicators. These interference indicators may, in turn, be used by terminals in other cells or their serving base stations to refine the open loop projection and to adjust for link imbalances or other sources of interference.

Base station 120 may also receive, from neighbor base stations, the target interference levels for terminals that may be scheduled by base station 120 on the specified resources. Base station 120 may determine the transmit power of its terminals on the specified resources based on open loop projection and in accordance with the target interference levels from the neighbor base stations. Base station 120 may determine the projected interference levels due to its terminals at the neighbor base stations based on the transmit power of these terminals. The projected interference levels may be broken into controlled and uncontrolled interference levels. Base station 120 may then send response messages carrying the projected interference levels to the neighbor base stations.

Figures 4, 5:
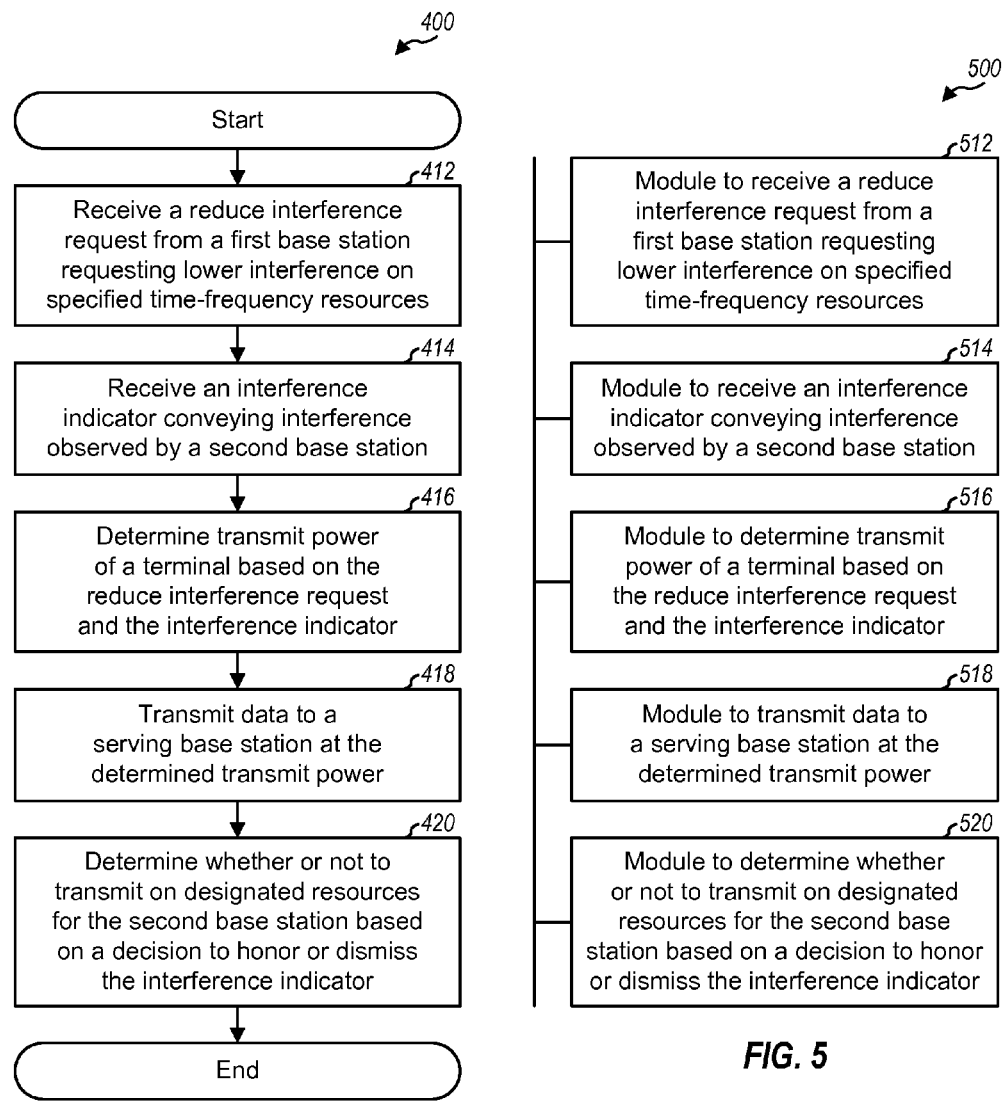
FIG. 4 shows a process performed by a terminal.
FIG. 5 shows an apparatus for the terminal

FIG. 4 shows a design of a process 400 performed by a terminal, e.g., terminal 110 in FIG. 1. The terminal may receive a reduce interference request from a first base station requesting lower interference on specified time-frequency resources (block 412). The terminal may also receive an interference indicator conveying interference observed by a second base station (block 414). The first and second base stations may be different base stations or the same base station. The terminal may determine its transmit power based on the reduce interference request and the interference indicator (block 416).

The interference indicator may comprise (i) an OSI indicator conveying interference observed by the second base station, (ii) an overload indicator conveying whether the second base station is overloaded, (iii) a high interference indicator providing advance notice of high interference due to terminals served by the second base station, and/or (iv) some other indication of interference or loading at the second base station.

In one design, the terminal may determine whether to honor or dismiss the reduce interference request based on decoding result for the reduce interference request, a priority level of the reduce interference request, a priority level of the terminal, the pathloss from the first base station to the terminal, the pathloss from a serving base station to the terminal, received power or received signal quality of the first base station, a resource assignment size for the terminal, the transmit power of the terminal, and/or other information. The terminal may determine its transmit power based on the reduce interference request, if a determination is made to honor the reduce interference request.

In one design, the terminal may determine whether to honor or dismiss the interference indicator based on decoding result for the interference indicator, the pathloss from the second base station to the terminal, the pathloss from the serving base station to the terminal, the received power or received signal quality of the second base station, the power classes of the serving base station and the second base station, the association types (e.g., restricted or unrestricted) of the serving base station and the second base station, and/or other information. The terminal may determine its transmit power based on the interference indicator, if a determination is made to honor the interference indicator. In one design, the terminal may dismiss the interference indicator if it is received from a base station of a first power class (e.g., a pico base station) and if the terminal is served by a base station of a second power class (e.g., a macro base station). The terminal may honor the interference indicator with greater weight or higher priority if it is received from a base station of the second power class (e.g., a macro base station) and if the terminal is served by a base station of the first power class (e.g., a pico base station).

The terminal may determine its transmit power in various manners in block 416. In one design, the terminal may determine a target interference level for the specified resources at the first base station based on the reduce interference request. The terminal may determine the pathloss from the first base station to the terminal. The terminal may then determine its transmit power based on the target interference level and the pathloss, e.g., as shown in equation (4). The terminal may also determine a back-off factor based on the interference indicator and may determine its transmit power based further on the back-off factor.

In another design, the terminal may adjust its transmit power for a prior time interval based on the interference indicator to obtain its transmit power for a current time interval, e.g., as shown in equation (7). In yet another design, the terminal may adjust a power offset for the prior time interval based on the interference indicator to obtain a power offset for the current time interval. The terminal may then determine its transmit power based on the power offset for the current time interval and a reference power level, e.g., as shown in equations (8) and (9).

In yet another design, the terminal may determine an initial transmit power based on the reduce interference request and may adjust the initial transmit power based on the interference indicator to obtain its transmit power. In yet another design, the terminal may determine an initial transmit power based on the interference indicator and may adjust the initial transmit power based on the reduce interference request to obtain its transmit power. In yet another design, the terminal may determine a maximum transmit power level and/or a minimum transmit power level based on the reduce interference request and/or the interference indicator. The terminal may determine an initial transmit power based on the interference indicator and/or the reduce interference request and may limit the initial transmit power based on the maximum and/or minimum transmit power levels to obtain its transmit power. The terminal may also determine its transmit power in other manners.

The terminal may transmit data to the serving base station at the determined transmit power (block 418). The terminal may determine whether or not to transmit on designated resources for the second base station based on a decision to honor or dismiss the interference indicator (block 420). The designated resources may be null pilot resources used by the second base station to determine controlled interference or uncontrolled interference at the second base station.

FIG. 5 shows a design of an apparatus 500 for a terminal Apparatus 500 includes a module 512 to receive a reduce interference request from a first base station requesting lower interference on specified time-frequency resources, a module 514 to receive an interference indicator conveying interference observed by a second base station, a module 516 to determine transmit power of the terminal based on the reduce interference request and the interference indicator, a module 518 to transmit data to a serving base station at the determined transmit power, and a module 520 to determine whether or not to transmit on designated resources for the second base station based on a decision to honor or dismiss the interference indicator.

FIG. 6 shows a design of a process 600 performed by a serving base station. The serving base station may receive a reduce interference request sent by a first base station to request lower interference on specified time-frequency resources (block 612). The serving base station may also receive an interference indicator conveying interference observed by a second base station (block 614). The first and second base stations may be different base stations or the same base station. The serving base station may schedule a terminal for data transmission on the specified time-frequency resources based on the reduce interference request and the interference indicator (block 616).

In one design, the serving base station may determine whether to honor or dismiss the reduce interference request based on a priority level of the reduce interference request, the pathloss from the first base station to the terminal, the pathloss from the serving base station to the terminal, a resource assignment size for the terminal, the transmit power of the terminal, the received signal quality of the terminal at the serving base station, and/or other information. The serving base station may then schedule the terminal based on the reduce interference request if a determination is made to honor the reduce interference request.

In one design, the serving base station may determine whether to honor or dismiss the interference indicator based on the pathloss from the second base station to the terminal, the pathloss from the serving base station to the terminal, the power classes of the serving base station and the second base station, the association types of the serving base station and the second base station, and/or other information. The serving base station may schedule the terminal based on the interference indicator if a determination is made to honor the interference indicator.

In one design of block 616, the serving base station may determine an initial transmit power based on the reduce interference request, at least one variable maintained by the serving base station for the terminal, and/or information reported by the terminal to the serving base station. The serving base station may then adjust the initial transmit power based on the interference indicator to obtain the transmit power of the terminal. In another design, the serving base station may determine the initial transmit power based on the interference indicator, the at least one variable maintained by the serving base station for the terminal, and/or the information reported by the terminal to the serving base station. The serving base station may then adjust the initial transmit power based on the reduce interference request to obtain the transmit power of the terminal. The serving base station may also determine the transmit power of the terminal in other manners. The serving base station may send to the first base station a response message comprising a projected interference level due to the terminal being scheduled on the specified time-frequency resources (block 618).

FIG. 7 shows a design of an apparatus 700 for a serving base station. Apparatus 700 includes a module 712 to receive at the serving base station a reduce interference request sent by a first base station to request lower interference on specified time-frequency resources, a module 714 to receive at the serving base station an interference indicator conveying interference observed by a second base station, a module 716 to schedule a terminal for data transmission on the specified time-frequency resources based on the reduce interference request and the interference indicator, and a module 718 to send to the first base station a response message comprising a projected interference level due to the terminal being scheduled on the specified time-frequency resources.

Figure 8:
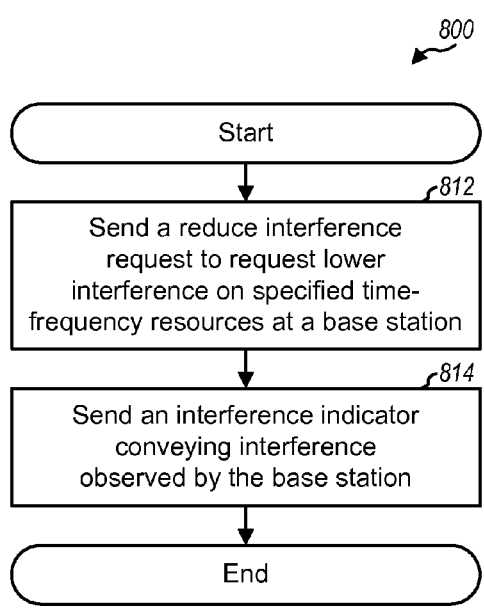
FIG. 8 shows a process performed by a neighbor base station.

FIG. 8 shows a design of a process 800 performed by a base station for interference mitigation. The base station may send a reduce interference request to request lower interference on specified time-frequency resources (block 812). The base station may send the reduce interference request over the air to at least one interfering terminal in at least one neighbor cell. Each interfering terminal may adjust its transmit power based on the reduce interference request. Alternatively or additionally, the base station may send the reduce interference request via a backhaul to at least one neighbor base station. Each neighbor base station may schedule its terminals based on the reduce interference request.

The reduce interference request may convey the specified time-frequency resources, a priority level of a terminal or data to be scheduled on the specified resources, a target interference level for the specified resources at the base station, a projected interference level on the specified resources due to the terminal to be scheduled on the specified resources, and/or other information. In one design of over-the-air transmission, the base station may determine the transmit power of the reduce interference request based on a target interference level for the specified time-frequency resources at the base station, e.g., as shown in equation (1). The base station may then send the reduce interference request at the determined transmit power.

The base station may also send an interference indicator conveying interference observed by the base station (block 814). The base station may send the interference indicator over the air to terminals in neighbor cells. Each terminal may adjust its transmit power based on the interference indicator. Alternatively or additionally, the base station may send the interference indicator via a backhaul to at least one neighbor base station. Each neighbor base station may control the transmit power of its terminals based on the interference indicator.

The base station may determine whether or not to send the interference indicator based on uncontrolled interference at the base station. In one design, the base station may measure received power of designated resources used by the base station to determine the uncontrolled interference or controlled interference, depending on whether terminals honoring or dismissing the interference indicators from the base station transmit on the designated resources. The base station may then estimate the uncontrolled interference at the base station based on the received power of the designated resources. In another design, the base station may receive reduce interference requests from neighbor base stations and, from these reduce interference requests, may determine the projected interference levels at the base station due to the terminals in the neighbor cells. The base station may estimate the uncontrolled interference at the base station based on the projected interference levels.

Figure 9:
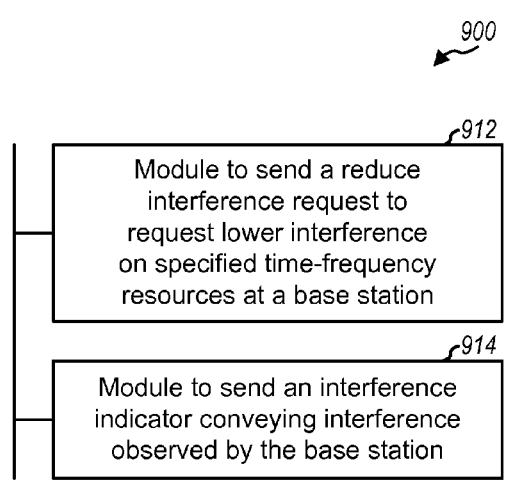
FIG. 9 shows an apparatus for the neighbor base station.

FIG. 9 shows a design of an apparatus 900 for a base station. Apparatus 900 includes a module 912 to send a reduce interference request to request lower interference on specified time-frequency resources at the base station, and a module 914 to send an interference indicator conveying interference observed by the base station.

The modules in FIGS. 5, 7 and 9 may comprise processors, electronics devices, hardware devices, electronics components, logical circuits, memories, software codes, firmware codes, etc., or any combination thereof.

Figure 10:
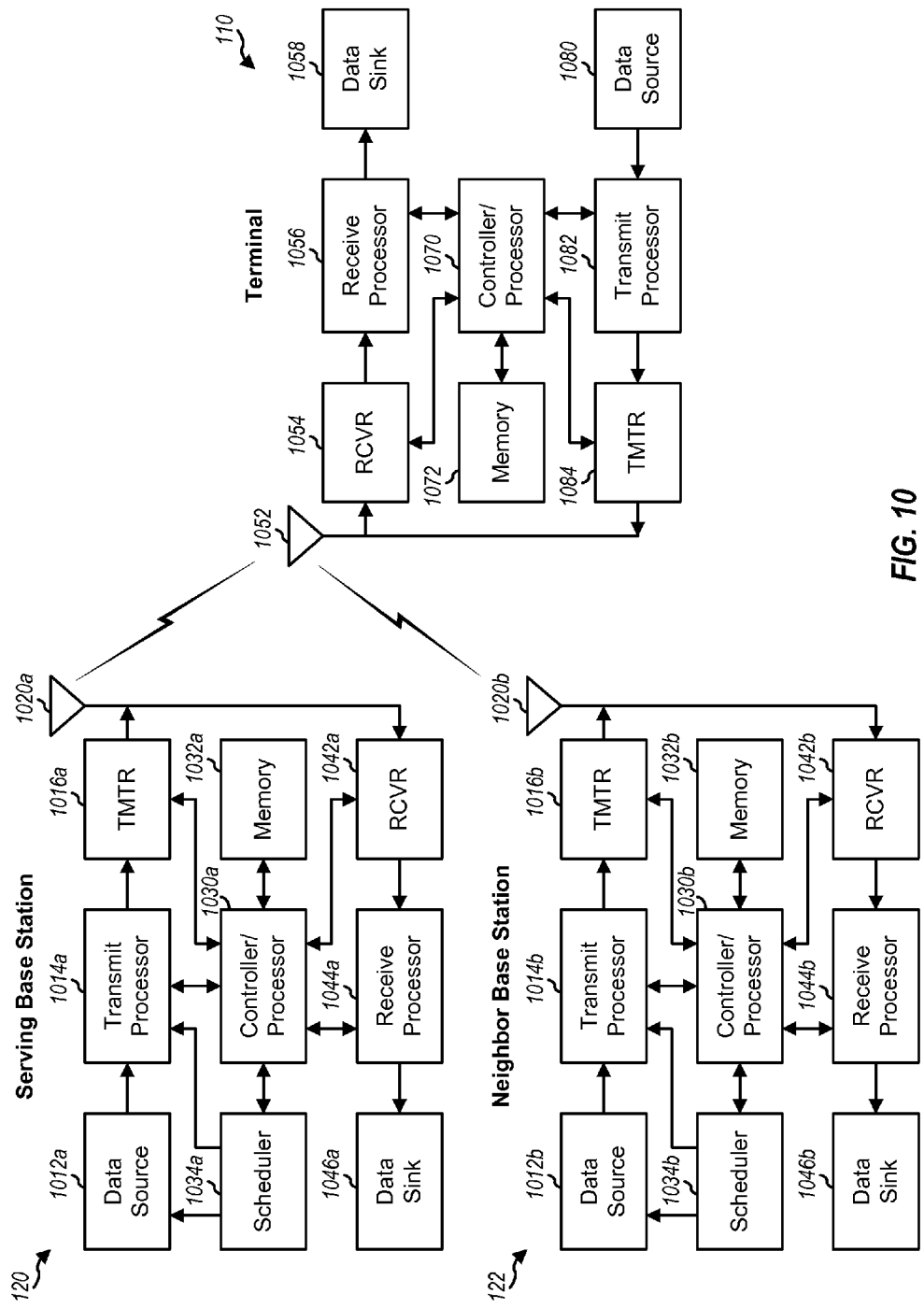
FIG. 10 shows a block diagram of the terminal and two base stations.

FIG. 10 shows a block diagram of a design of terminal 110, serving base station 120, and neighbor base station 122. At serving base station 120, a transmit processor 1014a may receive data from a data source 1012a, control information (e.g., reduce interference requests, interference indicators, etc.) from a controller/processor 1030a, and scheduling information (e.g., assignment/grant messages) from a scheduler 1034a. Processor 1014a may process (e.g., encode and modulate) the data and other information to obtain data symbols and control symbols, respectively. Processor 1014a may also generate pilot symbols. Processor 1014a may process the data, control, and pilot symbols (e.g., for OFDM, CDMA, etc.) and provide output samples. A transmitter (TMTR) 1016a may condition (e.g., convert to analog, amplify, filter, and upconvert) the output samples and generate a downlink signal, which may be transmitted via an antenna 1020a.

Neighbor base station 122 may similarly process data, control information, and scheduling information for terminals served by base station 122. The data, control and scheduling information, and pilot may be processed by a transmit processor 1014b, conditioned by a transmitter 1016b, and transmitted via an antenna 1020b.

At terminal 110, an antenna 1052 may receive the downlink signals from base stations 120 and 122 and other base stations. A receiver (RCVR) 1054 may condition (e.g., filter, amplify, downconvert, and digitize) a received signal from antenna 1052 and provide input samples. A receive processor 1056 may process the input samples (e.g., for OFDM, CDMA, etc.) and provide detected symbols. Processor 1056 may further process (e.g., demodulate and decode) the detected symbols, provide decoded data for terminal 110 to a data sink 1058, and provide decoded control information and scheduling information to a controller/processor 1070.

On the uplink, a transmit processor 1082 may receive and process data from a data source 1080 and control information (e.g., resource requests) from controller/processor 1070 and provide output samples. A transmitter 1084 may condition the output samples and generate an uplink signal, which may be transmitted via antenna 1052. At each base station, the uplink signals from terminal 110 and other terminals may be received by antenna 1020, conditioned by a receiver 1042, and processed by a receive processor 1044. Processor 1044 may provide decoded data to a data sink 1046 and decoded control information to controller/processor 1030.

Controllers/processors 1030a, 1030b and 1070 may direct the operation at base stations 120 and 122 and terminal 110, respectively. Processor 1070 and/or other modules at terminal 110 may perform or direct process 400 in FIG. 4 and/or other processes for the techniques described herein. Processor 1030 and/or other modules at each base station may perform or direct process 600 in FIG. 6, process 800 in FIG. 8, and/or other processes for the techniques described herein. Memories 1032a, 1032b and 1072 may store data and program codes for base stations 120 and 122 and terminal 110, respectively. Schedulers 1034a and 1034b may schedule terminals for communication with base stations 120 and 122, respectively, and may assign resources to the scheduled terminals.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   receiving a reduce interference request from a first base station requesting lower interference on specified time-frequency resources;
   receiving from a second base station an interference indicator conveying interference observed by the second base station;
   determining transmit power of a terminal based on the reduce interference request and the Interference indicator; and
   transmitting data to a serving base station at the determined transmit power.

2. The method of claim 1, wherein the determining transmit power of the terminal comprises
   determining whether to honor or dismiss the reduce interference request based on at least one of decoding result for the reduce interference request, a priority level of the reduce interference request, a priority level of the terminal, pathloss from the first base station to the terminal, pathloss from the serving base station to the terminal, received power or received signal quality of the first base station, a resource assignment size for the terminal, and the transmit power of the terminal, and determining the transmit power of the terminal based on the reduce interference request if a determination is made to honor the reduce interference request.

3. The method of claim 1, wherein the determining the transmit power of the terminal comprises determining whether to honor or dismiss the interference indicator based on at least one of decoding result for the interference indicator, pathloss from the second base station to the terminal, pathloss from the serving base station to the terminal, received power or received signal quality of the second base station, power classes of the serving base station and the second base station, and association types of the serving base station and the second base station, and determining the transmit power of the terminal based on the interference indicator if a determination is made to honor the interference indicator.

4. The method of claim 1, further comprising:

dismissing the interference indicator if the second base station is of a first power class and the serving base station is of a second power class; and honoring the interference indicator with greater weight or higher priority if the second base station is of the second power class and the serving base station is of the first power class.

5. The method of claim 1, wherein the determining the transmit power of the terminal comprises determining an initial transmit power based on the reduce interference request, and adjusting the initial transmit power based on the interference indicator to obtain the transmit power of the terminal.

6. The method of claim 1, wherein the determining the transmit power of the terminal comprises determining an initial transmit power based on the interference indicator, and adjusting the initial transmit power based on the reduce interference request to obtain the transmit power of the terminal.

7. The method of claim 1, wherein the determining the transmit power of the terminal comprises determining a target interference level for the specified time-frequency resources at the first base station based on the reduce interference request, determining pathloss from the first base station to the terminal, and determining the transmit power of the terminal based on the target interference level and the pathloss.

8. The method of claim 7, wherein the determining the transmit power of the terminal further comprises determining a back-off factor based on the Interference indicator, and determining the transmit power of the terminal based further on the back-off factor.

9. The method of claim 1, wherein the determining the transmit power of the terminal comprises adjusting transmit power of the terminal for a prior time interval based on the interference indicator to obtain transmit power of the terminal for a current time interval.

10. The method of claim 1, wherein the determining the transmit power of the terminal comprises adjusting a power offset for a prior time interval based on the interference indicator to obtain a power offset for a current time interval, and determining the transmit power of the terminal based on the power of offset for the current time interval and a reference power level.

11. The method of claim 1, wherein the determining the transmit power of the terminal comprises determining at least one of a maximum transmit power level and a minimum transmit power level used on at least one of the reduce interference request and the interference indicator, determining an initial transmit power based on the interference indicator or the reduce interference request, and limiting the initial transmit power based on at least one of the maximum and minimum transmit power levels to obtain the transmit power of the terminal.

12. The method of claim 1, wherein the interference indicator conveys at least one of interference observed by the second base station, whether the second base station is overloaded, and advanced notice of high interference due to terminals served by the second base station.

13. The method of claim 1, further comprising:

determining whether or not to transmit on designated resources for the second base station based on a decision to honor or dismiss the interference indicator, the designated resources being used by the second base station to determine controlled interference or uncontrolled interference at the second base station.

14. The method of claim 1, wherein the first and second base stations are same base station.

15. An apparatus for wireless communication, comprising:

means for receiving a reduce interference request from a first base station requesting lower interference on specified time-frequency resources;

means for receiving from a second base station an interference indicator conveying interference observed by the second base station;

means for determining transmit power of a terminal based on the reduce interference request and the interference indicator; and means for transmitting data to a serving base station at the determined transmit power.

16. The apparatus of claim 15, wherein the means for determining the transmit power of the terminal comprises means for determining whether to honor or dismiss the reduce interference request, means for determining whether to honor or dismiss the interference indicator, and means for determining the transmit power of the terminal based on the reduce interference request if a determination is made to honor the reduce interference request and based on the interference indicator if a determination is made to honor the interference indicator.

17. The apparatus of claim 15, wherein the means for determining the transmit power of the terminal comprises means for determining an initial transmit power based on the reduce interference request, and means for adjusting the initial transmit power based on the interference indicator to obtain the transmit power of the terminal.

18. The apparatus of claim 15, wherein the means for determining the transmit power of the terminal comprises means for determining an initial transmit power based on the interference indicator, and means for adjusting the initial transmit power based on the reduce interference request to obtain the transmit power of the terminal.

19. The apparatus of claim 15, further comprising:
means for determining whether or not to transmit on designated resources for the second base station based on a decision to honor or dismiss the interference indicator, the designated resources being used by the second base station to determine controlled interference or uncontrolled interference at the second base station.

20. An apparatus for wireless communication, comprising:
at least one processor configured to:
receive a reduce interference request from a first base station requesting lower interference on specified time-frequency resources,
receive from a second base station an interference indicator conveying interference observed by the second base station,
determine transmit power of a terminal based on the reduce interference request and the interference indicator, and
send data to a serving base station at the determined transmit power.

21. The apparatus of claim 20, wherein the at least one processor is configured to
determine whether to honor or dismiss the reduce interference request,
determine whether to honor or dismiss the interference indicator, and
determine the transmit power of the terminal based on the reduce interference request if a determination is made to honor the reduce interference request and based on the interference indicator if a determination is made to honor the interference indicator.

22. The apparatus of claim 20, wherein the at least one processor is configured to:
determine an initial transmit power based on the reduce interference request, and
adjust the initial transmit power based on the interference indicator to obtain the transmit power of the terminal.

23. The apparatus of claim 20, wherein the at least one processor is configured to:
determine an initial transmit power based on the interference indicator, and
adjust the initial transmit power based on the reduce interference request to obtain the transmit power of the terminal.

24. The apparatus of claim 20, wherein the at least one processor is configured to determine whether or not to transmit on designated resources for the second base station based on a decision to honor or dismiss the interference indicator, the designated resources being used by the second base station to determine controlled interference or uncontrolled interference at the second base station.

25. A computer program product, comprising:
a non-transitory computer-readable medium comprising:
code for causing at least one computer to receive a reduce interference request from a first base station requesting lower interference on specified time-frequency resources,
code for causing the at least one computer to receive from a second base station an interference indicator conveying interference observed by the second base station,
code for causing the at least one computer to determine transmit power of a terminal based on the reduce interference request and the interference indicator, and
code for causing the at least one computer to send data to a serving base station at the determined transmit power.

* * * * *